No. 705,802. Patented July 29, 1902.
G. WILKINSON.
CABLE TERMINAL BOX FOR ELECTRICITY SUPPLY PURPOSES.
(Application filed Apr. 21, 1902.)
(No Model.) 2 Sheets—Sheet 1.

Witnesses.
Walter Allen
Geo. C. Pitton

Inventor.
George Wilkinson.
by Herbert W. T. Jenner.
Attorney.

No. 705,802. Patented July 29, 1902.
G. WILKINSON.
CABLE TERMINAL BOX FOR ELECTRICITY SUPPLY PURPOSES.
(Application filed Apr. 21, 1902.)

(No Model.) 2 Sheets—Sheet 2.

Witnesses.
Walter Allen
Geo. C. Poulton

Inventor.
George Wilkinson
by Herbert W. P. Jenner.
Attorney.

UNITED STATES PATENT OFFICE.

GEORGE WILKINSON, OF HARROGATE, ENGLAND.

CABLE-TERMINAL BOX FOR ELECTRICITY-SUPPLY PURPOSES.

SPECIFICATION forming part of Letters Patent No. 705,802, dated July 29, 1902.

Application filed April 21, 1902. Serial No. 104,584. (No model.)

*To all whom it may concern:*

Be it known that I, GEORGE WILKINSON, a subject of the King of Great Britain, residing at Harrogate, in the county of York, England, have invented certain new and useful Improvements in Cable-Terminal Boxes for Electricity-Supply Purposes; and I do hereby declare the following to be a full, clear, and exact description of the invention, such as will enable others skilled in the art to which it appertains to make and use the same.

My invention relates more particularly to cable-terminal boxes commonly known as "house cut-out" boxes, in which the supply cable or cables terminate and from which the consumers' cables derive their supply of electrical energy.

The object of the said invention is to obtain reliable surface contact within the box and efficient earthing thereof by compression and maintain the same by the expansive force of a spring washer or washers.

In order that my invention may be clearly understood, I now make reference to the drawings forming a part of this specification, which drawings illustrate methods of carrying out the invention as applied, for example, to two designs of boxes, although I do not limit myself to any special design of box.

Figure 1:
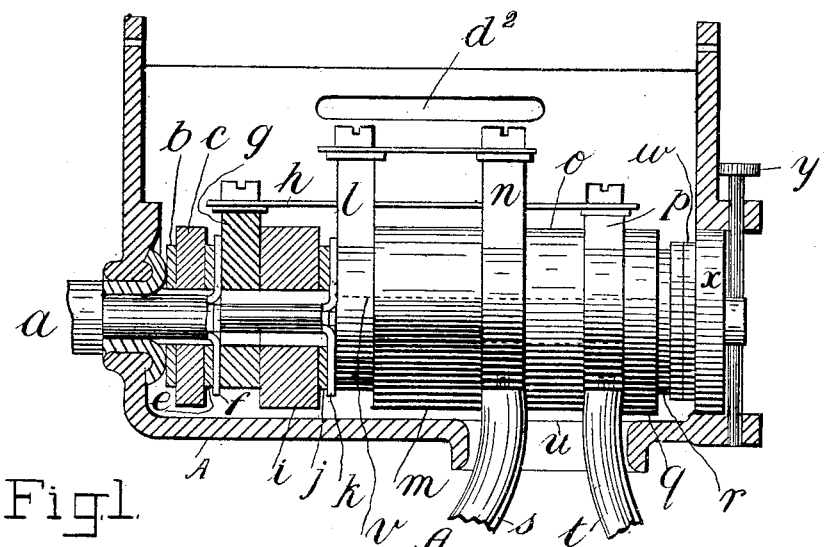
Figure 2:
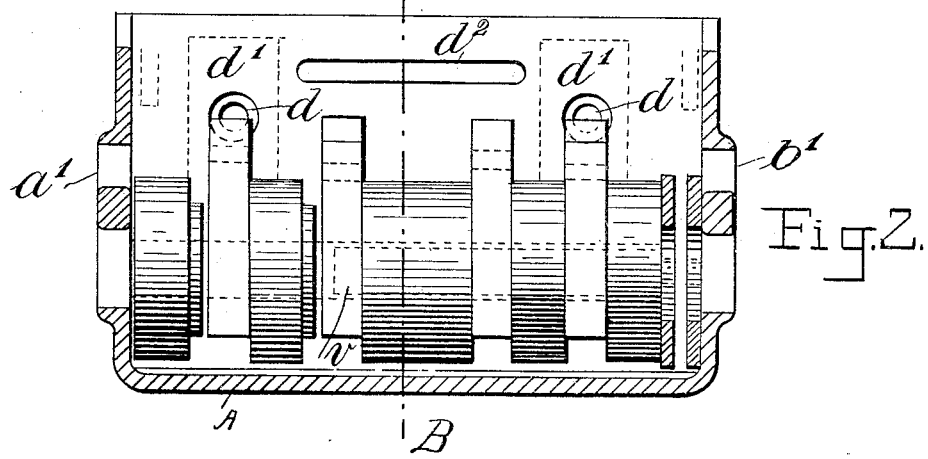
Figure 3:
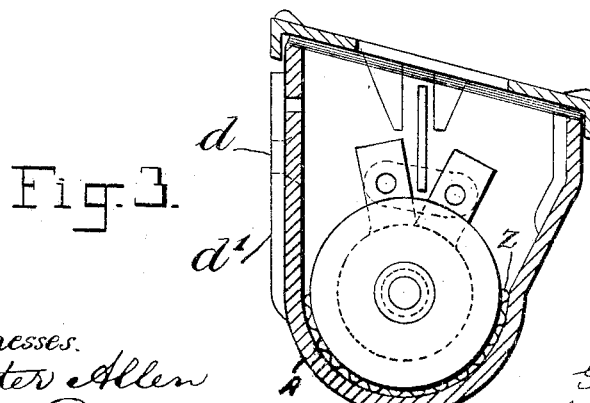
Figure 4:
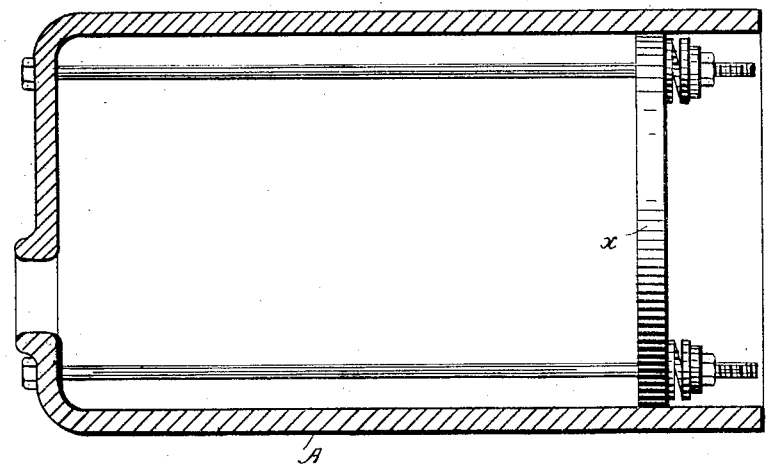

Figure 1 is a sectional side elevation of a single-pole cut-out box used in conjunction with a lead-covered concentric cable and two separate rubber or other insulated cables, showing the cables in position and the washer compressed. Fig. 2 is a sectional side elevation of a double-pole cut-out box in which the cables are not shown and the washer, here shown in section, is not compressed. Fig. 3 is a cross-section taken on the line A B of Fig. 2. Fig. 4 is a modification.

Referring to Fig. 1, the concentric supply-cable $a$ enters the box A through the hole in the end thereof. The lead covering (if such be employed) on the cable is dished out and turned over the inside edge of the said hole and pressed hard thereupon by the means hereinafter described, thus making a waterproof seal and earthing the box to the lead of the cable. A metal washer $b$ may then be passed over the cable, either in addition to or in substitution for the dished part of the cable-sheathing $a$, as before mentioned. An insulating-disk $c$ is next passed over the cable and then a metal washer $e$, after which the outer conductors $f$ of the concentric cable are opened out at right angles to the cable and radially therefrom. A washer $g$ is next passed over the inner cable and pressed against the conductors $f$, said washer $g$ having an extension or lug provided at the extremity thereof, with a screw for the attachment of a link or fuse $h$. Another insulating-disk $i$ and metal washer $j$ are passed over the inner cable, after which the inner conductors $k$ are spaced out in the same manner as the outer ones. A metal washer $l$, having an extension and screw, is next pressed against the inner conductors, after which another insulating-disk $m$ is inserted, then metal washer $n$, insulating-disk $o$, metal washer $p$, insulating-disk $q$, and, if desired, another metal washer $r$. The two insulated service-cables $s$ and $t$ are brought through the hole $u$ in the box and soldered into holes in the bottom of the washers $n$ and $p$, respectively. A round wooden peg $v$ is passed through the last-named washers and disks until it reaches the end of the concentric cable at the point of branching of the conductors $k$, the function of this peg $v$ being to keep the parts in position. A spring-washer $w$ is next inserted through the hole at the right-hand end of the box and covered with a metal lid $x$, (or the lid $x$ may have the spring-washer attached to its inner side,) when strong pressure is brought to bear on the metal lid $x$, forcing it into position against the resistance of the spring-washer $w$, and the lid is then secured in position by any suitable means, such as a nail $y$, passed through holes in lugs on the end of the box, or by screws. The compression thus exerted jams all the washers and conductors into intimate and reliable surface contact, which is maintained by the expansive force of the spring-washer.

The service-cables $s$ and $t$ may each enter the box by a separate hole, and instead of being soldered into holes at the bottom of the washers $n$ and $p$ they may each be bared of its insulation and spread out or curved around between a pair of metal washers, so as to maintain the contact by compression in the case of these cables as well as of the supply-cable.

Instead of the rail $y$ other fastening devices may be employed, such as screws or a horseshoe-shaped pin, the arms of which may be driven through two pairs of lugs, which may be provided on the end of the box.

The lugs on the washers $g$, $l$, $n$, and $p$ form the terminals of the cables and are connected together as required by connecting links or fuses of any suitable pattern, and the part of the box containing these may, if desired, be made a separate compartment from that containing the washers and disks before referred to, the extensions on the said washers passing through a suitable slot or slots into the said compartments. The said slot forms a channel through which the box is filled with insulating compound to improve the insulation and exclude moisture and the like from the various connections.

Figs. 2 and 3 show a design adapted for a double-pole cut-out box with a separate compartment for each fuse. The concentric cable can be put in from either end and the compression-washer at either end. The single insulated cables are brought into the box through the slots $a'$ $b'$ and are soldered into holes in the extension-arms of the contact-disks. This box may be used with two pairs of single insulated cables, one pair entering through the slot at each end, or if only one pair of single insulated cables are used they enter the box at one end, the slot at the other end, which is not required, being covered by a metal plate.

Instead of the spring-washer being last inserted, as before described, it may be inserted first within the lid $x$ or against the end of the box and be kept in a state of compression by any suitable appliance while the remaining parts are placed in position, and on being released will then by its elasticity exert the required pressure through all the disks and washers.

The metal box may be lined with a layer or layers of corrugated or indurated paper or other insulating material, as shown in Fig. 3 at $z$. Round insulating-disks are described and shown; but they may of course be made oblong, gimped edged, or of any other suitable shape.

It will be obvious that by varying the length of the box and the number of insulating-disks and terminal disks the arrangement can be readily adapted for separately-insulated cables, concentric cables, or triple concentric cables. I do not confine myself to the use of one spring-washer, as a number of springs may be employed to exert the necessary pressure, nor need the insulating and terminal disks all be placed in one line, as more than one group of these may be employed, each group being furnished with its own compression-spring.

Instead of exerting the force of the springs in compression upon the disks by placing the outer casing in tension, as before described, I may make the whole or part of one end of the box loose and running upon bolts traversing the box longitudinally, so that by placing a spring-washer upon each of these bolts and following it with a nut on the exposed end of the bolt the compression may be obtained by tightening up the nuts, as shown in Fig. 4.

The box may be screwed or otherwise fixed in the required position, screw-holes $d$, Fig. 2, being, if necessary, countersunk in a thickened portion $d'$ of the wall of the box or in lugs projecting from the box. It may also be provided with a glazed opening for inspection and sealed in any suitable manner to guard against any tampering on the part of unauthorized persons. A slot $d^2$ is provided at the back of the box to act as an air-vent when a fuse blows off and heats the air within the box. This slot does not afford access to the terminals, as the slot faces the wall against which the box is fixed.

I claim as my invention—

1. The combination, with a box, and a supply-cable which enters the box and has its inner and outer conductors spread out inside the box in different planes; of service-cables which also enter the box, separate contact-washers which bear against the said conductors and service-cables respectively, fuses which connect the contact-washers of the inner and outer conductors with the service-cables to which they pertain, and a spring which operates longitudinally of the supply-cable and which holds its inner and outer conductors in contact with their respective contact-washers, substantially as set forth.

2. The combination, with a box, and a supply-cable which enters the box and has its lead covering and its inner and outer conductors spread out inside the box in different planes and insulated from each other; of service-cables which also enter the box, separate contact-washers which bear against the said conductors and service-cables respectively, fuses which connect the contact-washers of the inner and outer conductors with the service-cables to which they pertain, and a spring which operates longitudinally of the supply-cable and which holds its inner and outer conductors in contact with their respective contact-washers and its lead covering in contact with the said box, substantially as set forth.

3. The combination, with a box, of a supply-cable which enters the box and has its conductors spread out inside it, a single service-cable which also enters the box, separate contact-washers which bear against the said conductors and the service-cable respectively, a fuse connecting the said washers, a spring which operates longitudinally of the said supply-cable and which holds its said conductors in contact with their contact-washer, and a second supply-cable and a second single service-cable operatively connected together so as to form a complete circuit with the first said supply and service cables, said supply-cables being arranged concentric of each other where they enter the said box, substantially as set forth.

In testimony whereof I affix my signature in presence of two witnesses.

GEORGE WILKINSON.

Witnesses:
ERNEST PRIESTLEY NEWTON,
JOSEPH BUTLER MIDDLETON.